United States Patent
Schuller et al.

(10) Patent No.: US 9,121,500 B2
(45) Date of Patent: Sep. 1, 2015

(54) DEVICE FOR OPERATING A PARKING LOCK OF A MOTOR VEHICLE AND CORRESPONDING METHOD

(75) Inventors: Dietmar Schuller, Altmannstein (DE); Martin Bauer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/115,757

(22) PCT Filed: Apr. 30, 2012

(86) PCT No.: PCT/EP2012/001848
§ 371 (c)(1),
(2), (4) Date: Dec. 17, 2013

(87) PCT Pub. No.: WO2012/152394
PCT Pub. Date: Nov. 15, 2012

(65) Prior Publication Data
US 2015/0041280 A1 Feb. 12, 2015

(30) Foreign Application Priority Data
May 6, 2011 (DE) .......................... 10 2011 100 804

(51) Int. Cl.
*F16H 63/48* (2006.01)
*F16H 63/34* (2006.01)

(52) U.S. Cl.
CPC .............. *F16H 63/48* (2013.01); *F16H 63/483* (2013.01); *F16H 63/3433* (2013.01); *F16H 63/3483* (2013.01)

(58) Field of Classification Search
CPC ... F16H 63/48; F16H 63/483; F16H 63/3483; F16H 63/3433
See application file for complete search history.

(56) References Cited

U.S. PATENT DOCUMENTS

| | | | |
|---|---|---|---|
| 5,919,112 A | 7/1999 | Michael et al. | |
| 6,139,468 A | 10/2000 | Goates et al. | |
| 6,527,670 B1 | 3/2003 | Gierer et al. | |
| 6,554,740 B2 | 4/2003 | Kuchn et al. | |
| 7,650,978 B2 | 1/2010 | Rühringer et al. | |
| 7,861,839 B2 * | 1/2011 | Schweiher et al. | ........ 192/220.2 |
| 2007/0284213 A1 | 12/2007 | Duhaime et al. | |

(Continued)

FOREIGN PATENT DOCUMENTS

| | | | |
|---|---|---|---|
| CN | 101387343 A | * | 3/2009 |
| CN | 101387343 A | | 3/2009 |
| CN | 201325442 Y | * | 10/2009 |

(Continued)

OTHER PUBLICATIONS

International Search Report issued by the European Patent Office in International Application PCT/EP2012/001848.

(Continued)

*Primary Examiner* — Huan Le
(74) *Attorney, Agent, or Firm* — Henry M. Feiereisen LLC.

(57) ABSTRACT

A device for operating a parking brake of a motor vehicle, wherein the parking lock includes an actuatable actuator element for disengaging the parking lock counter to a restoring pressure, and an actuatable holding device for holding the parking lock when the latter is disengaged. The device includes a selector control lever and a transmission control device communicating therewith, the selector control device actuating the holding device and the transmission control device actuating the actuator element.

14 Claims, 2 Drawing Sheets

(56) References Cited

U.S. PATENT DOCUMENTS

2010/0241324 A1    9/2010  Ishikawa et al.
2012/0160631 A1*   6/2012  Bauer et al. ............... 192/219.5

FOREIGN PATENT DOCUMENTS

| CN | 201325442 | Y |   | 10/2009 |
| CN | 201507638 | U | * | 6/2010 |
| CN | 201507638 | U |   | 6/2010 |
| CN | 101947953 | A |   | 1/2011 |
| CN | 101947953 | A | * | 1/2011 |
| DE | 19625019 |   |   | 1/1998 |
| DE | 198 14 657 |   |   | 10/1999 |
| DE | 19820920 |   |   | 11/1999 |
| DE | 19858543 |   |   | 6/2000 |
| DE | 19943519 |   |   | 3/2001 |
| DE | 199 63 782 |   |   | 7/2001 |
| DE | 100 36 601 |   |   | 2/2002 |
| DE | 100 30 085 |   |   | 3/2002 |
| DE | 102005008383 |   |   | 9/2005 |
| DE | 102004030007 |   |   | 3/2006 |
| DE | 102005046278 |   |   | 4/2006 |
| DE | 102006053762 |   |   | 6/2007 |
| DE | 102008029891 |   |   | 2/2010 |
| DE | 102009043324 |   |   | 9/2010 |
| DE | 102009018975 |   | * | 10/2010 |
| DE | 102009018975 | A1 |   | 10/2010 |
| EP | 1855033 |   |   | 4/2007 |
| JP | 2011064320 |   |   | 3/2011 |
| JP | 20100106886 |   |   | 5/2015 |

OTHER PUBLICATIONS

Audi Service Training: AudiA8'10 Kraftübertragung. Audi AG: I/VK-35, 2010 (whole document).

Audi A8 '08—Technical Features, Self Study Programme 282, Sep. 2002, pp. 1-96.

Korean Office Action issued by the Korean Patent Office in Korean Application 9-5-2015-005499559.

Chinese Search Report issued by the Chinese Patent Office in Chinese Application 2012800220867.

* cited by examiner

DEVICE FOR OPERATING A PARKING LOCK OF A MOTOR VEHICLE AND CORRESPONDING METHOD

CROSS-REFERENCES TO RELATED APPLICATIONS

This application is the U.S. National Stage of International Application No. PCT/EP2012/001848, filed Apr. 30, 2012, which designated the United States and has been published as International Publication No. WO 2012/152394 and which claims the priority of German Patent Application, Serial No. 10 2011 100 804.0, filed May 6, 2011, pursuant to 35 U.S.C. 119(a)-(d).

BACKGROUND OF THE INVENTION

The invention relates to a device for operating a parking lock of a motor vehicle, wherein the parking lock includes an actuatable actuator device for disengaging the parking lock against a restoring pressure and an actuatable holding device for holding the parking lock in the disengaged state.

The invention also relates to a method for operating a parking lock of a motor vehicle or in the parking lock has an actuatable actuator device for disengaging the parking lock against a restoring pressure and an actuatable holding device for holding the parking lock in the disengaged state.

Devices and methods of the above-mentioned type are known from the state-of-the-art. A parking lock serves for locking the transmission, in particular the automatic transmission of a motor vehicle, when the motor vehicle stands still so that the transmission blocks the driving wheels of the motor vehicle. It is also known to automatically engage the parking lock in dependence on different parameters in order to immobilize the motor vehicle. Thus it is known in modern motor vehicles that the parking lock is automatically engaged when the ignition key is removed from the ignition lock thereby preventing the vehicle from rolling away.

For example, from the German published application DE 196 25 091 A1 a device is known by means of which the parking lock is actuated. The parking lock includes means for engaging the parking lock and a holding device in the form of a holding magnet for holding the parking lock in the disengaged state so that the holding device prevents engagement of the parking lock. The holding magnet is controlled by a transmission control device, while the means for engaging the parking brake act in response to signals from the ignition lock, the vehicle speed and the rotational speed of the motor. The known device has the disadvantage that when the transmission control device fails, engagement of the parking lock cannot be prevented.

The invention is thus based on the object to create a device and a method which enable in a simple manner to improve the safety and functionality of the parking brake.

SUMMARY OF THE INVENTION

The object on which the invention is based is solved by the features of the independent claims.

The device according to the invention is characterized in that it includes a selector-lever control device and a transmission control device communicating therewith, wherein the selector-lever control device actuates the holding device and respectively the transmission control device actuates the actuator. From modern motor vehicles selector-lever control devices are known which are assigned to the selector-lever or the switching-lever which can be actuated by the driver, in order to detect the choice of the driver regarding the gear stage and as the case may be to control a corresponding display unit which displays the choice of the driver. According to the invention the selector-lever control device is connected with the holding device while the transmission control device is connected with the actuator device. Thus the actuator device can be actuated by means of the transmission control device and with this the parking lock can be released or respectively disengaged. By correspondingly controlling the holding device by means of the selector-lever control device the parking lock can be held in its disengaged state even when the transmission control device fails. This allows the driver to determine himself whether in case of failure of the transmission control device the parking lock should be engaged or continued movement of the motor vehicle should be enabled. Compared to the state-of-the-art the continued functioning of the parking lock is ensured with simple means and a higher safety is offered in case of a (partial) system failure.

It is particularly preferred that the transmission control device can be or is switched off in dependence on the switching position of a selector-lever, which switching position can be detected by the selector-lever control device. Thus when the selector-lever control device detects a corresponding choice of the driver by recognizing a defined switching position of the selector-lever, the transmission control device can be or is preferably switched off. In particular the switching position of the selector-lever is a parking position and/or neutral position in which no gear for transmitting a torque to the drive wheels of a motor vehicle is engaged. When a driver switches the selector-lever into the neutral switching position, the transmission device which at this moment is no longer needed, is switched off, which leads to significant energy or electricity savings. When the driver moves the selector-lever into another switching position, the transmission control device is preferably activated again. In the neutral position however, the driver has the choice whether he wants to engage the parking lock even though the transmission control device is turned off, for example by engaging the selector-lever position P.

Preferably the transmission control device and the selector-lever control device communicate with each other and/or with the holding device or respectively actuator device via at least one wire-based or wireless data connection, in particular via a bus-system. Particularly preferably the selector-lever control device is configured as slave and the transmission control device as master. During normal operation the transmission control device thus gives the command to engage the parking brake and to release the holding device i.e., to release the parking lock function, wherein the command for releasing the holding device is then executed by the selector-lever control device by way of actuating the holding device. The transmission control device preferably gathers data relating to the transmission such as for example cooling-medium temperature selector-lever position, actual gear stage, actual speed of the vehicle, position of the ignition key, hydraulic pressure and/or at least a rotational speed. Depending on the operating state of the transmission control device the transmission control device can additionally issue commands to the selector-lever control device so that the selector-lever control device prevents engagement of defined switching positions of the selector-lever so that for example engagement of the parking position P in which the parking lock is preferably automatically engaged cannot be engaged while the motor vehicle accelerates or has exceeded a predetermined driving speed.

According to an advantageous refinement of the invention the selector-lever control device and the transmission control device can be or are connected independent of each other with an energy source or respectively with an energy source motor vehicle. This ensures that even when one of the control devices fails the other control device continues to be supplied with energy and thus can essentially perform its function. Such a division of the control of holding device and actuator device enables to satisfy safety demands on the actuation of the parking brake without further valves or devices.

According to a preferred refinement of the invention the actuator device is configured as electrically actuatable actuator device and in particular includes an electrically actuabtable hydraulic valve. The hydraulic valve is expediently arranged upstream of a hydraulic actuator which actuates the parking lock. As an alternative it is also conceivable to provide an actuator which actuates by means of an electromotor. By corresponding actuation of the hydraulic valve the hydraulic actuator is controlled and thereby the parking lock disengaged or respectively allows engagement of the parking lock. In particular, the parking lock is disengaged by pressurizing the hydraulic actuator by corresponding switching of the hydraulic valve. It is noted that the actuator is configured so that it not only disengages the parking lock but also if needed maintains disengagement of the parking lock, so that even without actuating the holding device a permanent disengagement of the parking brake by the actuator is possible.

Preferably the hydraulic valve is configured so that it connects the actuator, which hydraulically actuates the parking lock, with the pressure source in a first extreme position in order to disengage the parking lock against the restoring pressure, and in a second extreme position switches the actuator hydraulically pressureless. In the second extreme position the actuator is urged back into its starting position due to the restoring pressure in which the parking lock is engaged. Preferably, the hydraulic valve is provided as proportional valve in order for example to be able to influence the speed of actuation of the actuator.

According to an advantageous refinement of the invention, for generating or providing a restoring pressure, a return spring i.e., an element which mechanically provides a restoring force is assigned to the actuator or respectively the hydraulically actuatable actuator, in particular in the form of a helical spring. Of course, two or further return springs can be assigned to the actuator. Preferably, a return of hydraulic pressure is provided parallel to the return spring, which return is provided for redundant resetting of the actuator. Particularly preferably the current which is necessary for disengagement is measured or detected and compared to an expected current. Based on the comparison value it is concluded whether at least one of the return mechanisms, return spring and/or pressure control hydraulic (return) pressure has failed or malfunctions.

Preferably the holding device has an electromagnetically actuatable locking mechanism for form fittingly holding the actuator or the parking lock in the disengaged state. The locking mechanism is characterized in that it holds the actuator form fittingly so that high actuating forces or currents are not required in order to hold the actuator in its disengaged position. The in particular electromagnetic actuation of the locking mechanism allows providing a holding device with low electricity consumption. Preferably, the locking mechanism holds the actuator in the disengaged position so long as it is supplied with current. In the currentless state the locking mechanism releases the actuator. This is particularly advantageous as described before when the transmission control device is also turned off. According to an alternative embodiment it is also conceivable to configure the locking mechanism so that it holds the actuator in the currentless state and releases the actuator when supplied with current so that the parking lock is engaged.

The method according to the invention is characterized in that the holding device is actuated by a selector-lever control device and the actuator device is actuated by a transmission control device. Particularly preferably, the transmission control device is turned off in dependence on a selector-lever position detected by the selector-lever control device in order to save electricity or energy. Further advantages become apparent from the description above. In particular the device as described above is actuated or operated by means of the method.

BRIEF DESCRIPTION OF THE DRAWING

In the following, the invention is explained in more detail by way of the drawing. It is shown in FIG. 1 the device according to the invention in a simplified representation and FIG. 2 a section of a hydraulic circuit for actuating the actuator device.

DETAILED DESCRIPTION OF PREFERRED EMBODIMENTS

Figure 1:
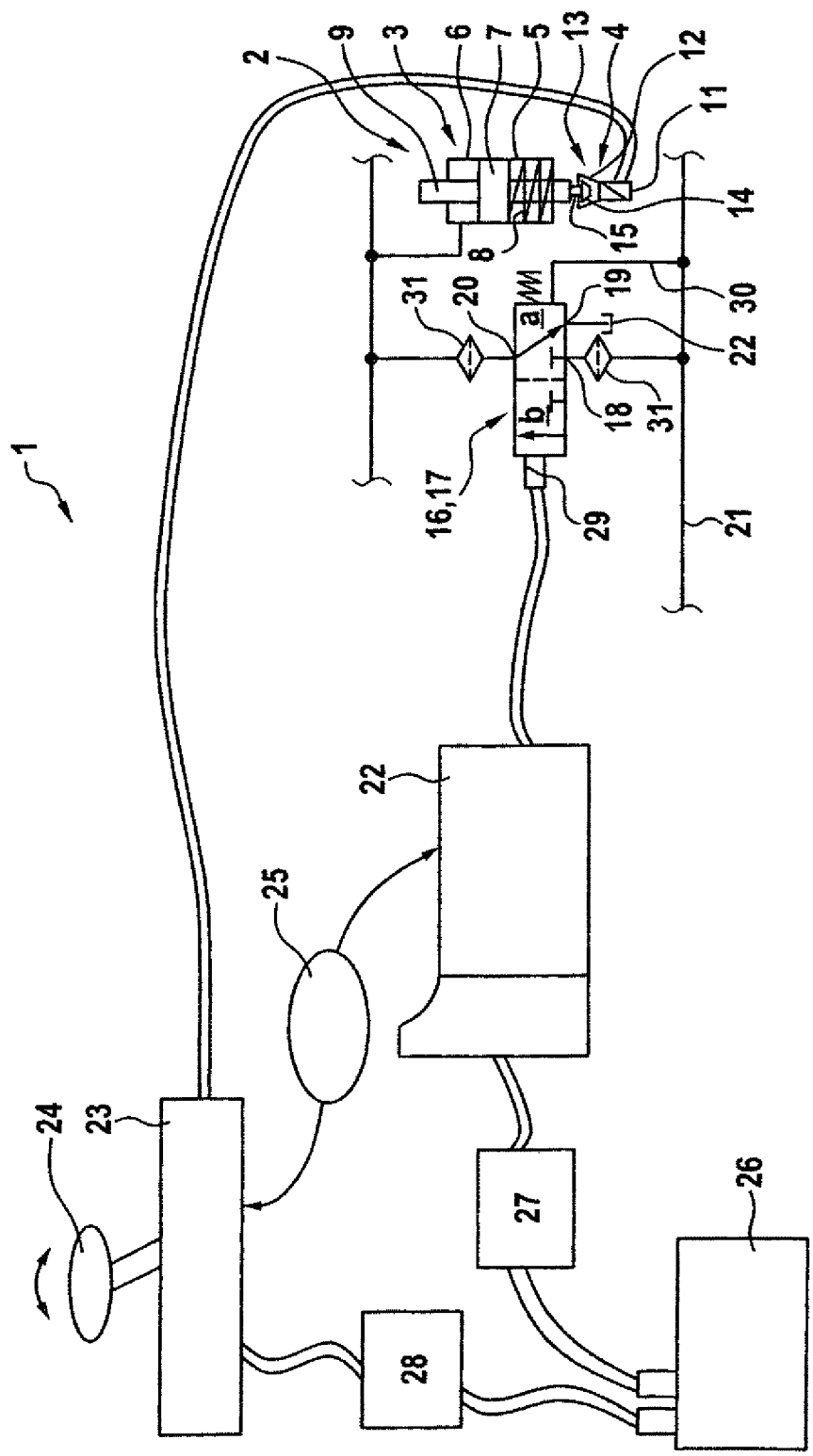

FIG. 1 shows in a simplified representation a device 1 for operating a parking lock 2 of a motor vehicle. The parking lock 2 has an actuator device 3 and a holding device 4. By means of the actuator device 3 the parking lock 2 can be disengaged or can be held disengaged. For this, the actuator device has a hydraulic actuator 5 which in a cylinder 6 has a piston 7 which is supported for axial displacement, wherein the piston 7 has or forms the locking element 9 of the parking lock 2. The piston 7 can be impinged on one side with pressurized hydraulic medium and on the other side impinged with a return spring 8, which urges the piston 7 into the locking position, i.e., serves for engaging the parking lock 2. The return spring 8 is preferably configured as helical spring and held under tension between a front side of the piston 7 and a front side of the cylinder 6.

While the end of the piston, which serves as locking element 9, traverses the cylinder 6 at a front side, the end of the piston that serves as holding element 10 traverses the cylinder 6 on an opposing side. The holding device 4 is assigned to this side. The holding device 4 includes an electromagnet 11 which acts on a locking mechanism 12. In the present case the locking mechanism 12 is configured as gripping arm pair 13. The holding element 10 of the piston 7 has on its end side a frustoconical insertion section 14 adjoined by a tapering 15. When the actuator 5 is actuated, the piston 7 is displaced in the direction of the holding device 4, wherein the insertion end moves between gripping arms 13 and due to the frustoconical shape the gripping arms are pushed apart until they fall back into the tapering 15 and as a result form fittingly engage behind the insertion end 14., whereby the piston 7 is held in the disengaged position of the parking lock 2. By actuating the electromagnet 11, the gripping arms 13 are moved toward each other or are pivoted so that the piston 7 is held in its disengaged position. When the electromagnet 11 is switched currentless, the gripping arms 13 move apart so that the piston 7 is released after which the return spring 8 urges the piston 7 into the locking position. Preferably at least one spring element is assigned to the gripping arms 13 which acts against the force of the current-impinged magnet, whereby the gripping arms 13 switch the gripping arms move apart or pivot apart when switching currentless.

For actuating the actuator 5 a hydraulic valve 16 is provided which is configured as switching valve 17 and has two switching positions a, b and three connections 18, 19, 20. The connection 18 is connected with a pressure line 21 representing a pressure source, while the connection 19 is connected with a hydraulic tank 22 and the connection 20 with the cylinder or respectively the actuator 5. In the switching position a, the actuator is connected with the hydraulic tank 22 i.e., is switched pressureless so that the return spring 8 displaces the piston 7 into the locking position when the gripping arms 13 have released the piston 7. In the switching position b, the switching valve connects the pressure line 21 with the actuator 5 so that the piston 7 is displaced against the restoring pressure of the return spring 8 and thereby the parking lock is disengaged.

The device 1 further includes a transmission control device 22 of a transmission of the motor vehicle which is preferably configured as automatic transmission. The device 1 further has a selector-lever control device 23 which is assigned to a selector-lever 24. The selector-lever control device 23 detects for example the position or switching position of the selector-lever 24 which can be set by the driver. The selector-lever control device 23 and the transmission control device 2 communicate with each other via a data connection 25. The transmission control device 22 is configured as master and the selector-lever control device 23 as slave so that the essential control or logic occurs or is located in the transmission control device 22. The transmission control device 22 for example actuates the hydraulic of the transmission corresponding to the selector-lever position of the selector-lever 24 in order to set a desired transmission ratio, in particular also in dependence on speed and rotational speed.

The transmission control device 22 is connected with an energy storage device 26 of the motor vehicle. The selector-lever control device 23 is also connected with the energy storage device 26 however, via a separate line so that the two control devices are connected with the energy source 26 independent of each other. The energy source 26 is preferably a rechargeable energy storage device which is in particular assigned to an electric machine of a drive device of the motor vehicle, wherein the drive device is particularly preferably configured as hybrid drive device. Between the transmission control device 22 and the energy storage device 26 and also between the selector-lever control device 23 and the energy storage device 26 a fuse 27, 26 is respectively provided or connected which protects the control devices from excessive voltages.

The transmission control device 22 is further operatively electrically connected with the actuator device 3 by a corresponding electric line. In particular, the transmission control device 22 is connected with an electrically actuatable actuator 29 of the hydraulic valve 16. The selector-lever control device 23 on the other hand is connected with the electromagnet 11 of the holding device by a corresponding electric line.

Thus, the holding device 4 is actuated or controlled by the selector-lever control device 23 and the actuator device 3 is actuated or controlled by the transmission control device 22. This ensures that also in case of failure of the transmission control device 22 the disengaged parking brake 2 remains disengaged and if needed can be engaged by actuating the electromagnet 11. This significantly increases the safety of the braking system because it enables the driver to actuate the parking lock even when the transmission control device 22 fails.

Preferably the transmission control device 22 is switched off in dependence on a position of the selector-lever 24 detected by the selector-lever control device 23. This allows to overall significantly decrease electricity consumption of the motor vehicle or the device 1 because the transmission control device 22 has a high electricity consumption. The driver further has the option to actuate the parking lock 2 by means of the selector-lever control device 23. It is in particular provided that the transmission control device 22 is turned off when the selector-lever 24 is in the position N i.e., in the neutral position in which no gear of the transmission control device 22 is to be engaged. In particular when the drive device is turned off, i.e. for example a combustion engine is shut off which otherwise could serve for charging the energy storage device 26, the decreased electricity consumption resulting from turning off the transmission control device 22 results in a significantly longer service life than previously possible. This enables the driver to use electric functions of the vehicle longer when the motor is shut off than previously, the operability is maintained longer than previously. As soon as the driver restarts the vehicle and/or as soon as the selector-lever 24 is moved into a corresponding different position, the transmission control device is expediently activated again. During operation, the switching valve 17 holds the parking lock disengaged in case of failure of the selector-lever control device, in case of failure of the transmission control device 22 the holding device 4 holds the parking lock disengaged.

Figure 2:
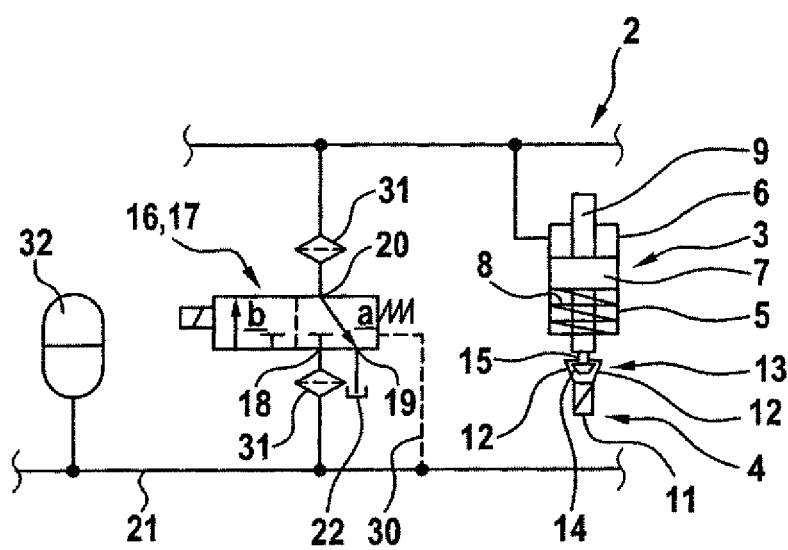

FIG. 2 shows an enlarged section of the actuator device 3 and the holding device 5. In the enlarged representation an optional control line 30 is shown which connects the pressure line 21 with a valve surface of the hydraulic valve 16 so that the hydraulic valve 16 is urged by the pressure in the pressure line 21 into the switching position a. The control line 30 can be provided in addition or as an alternative to the return spring which is assigned to the switching valve. Expediently one or multiple pressure filters 31 are assigned to the hydraulic valve 16. On the pressure line 21 a hydraulic pressure storage device 32 is further provided so that also when the drive device and/or an electric pump for delivering the hydraulic medium is turned off, sufficient pressure is available at least for a certain period of time in order to disengage the parking lock 2.

The invention claimed is:

1. A device for operating a parking lock of a motor vehicle, comprising:
    an actuatable actuator device for disengaging the parking lock against a restoring pressure and an actuatable holding device for holding the parking lock in the disengaged state;
    a selector-lever control device; and
    a transmission control device in communication with the selector-lever control device, said selector-lever control device actuating the holding device, said transmission control device actuating the actuator device.

2. The device of claim 1, wherein the transmission control device and the selector-lever control device communicate with one another by at least one wire-based or wireless data connection.

3. The device of claim 1, wherein the selector-lever control device is configured as slave and the transmission control device as master.

4. The device of claim 1, wherein the selector-lever control device and the transmission control device are constructed connectable or are connected independent of each other with an energy source of the motor vehicle.

5. The device of claim 1, wherein the actuator device is configured as electrically actuatable actuator device.

6. The device of claim 1, wherein the transmission control device is constructed to be turned off in dependence on a switching position of a selector-lever.

7. The device of claim 6, wherein the selector-lever control device is constructed for detection of the switching position.

8. The device of claim 1, wherein the actuator device includes an electrically actuatable hydraulic valve.

9. The device of claim 8, wherein the hydraulic valve is configured as switching valve and in a first extreme position connects an actuator of the actuator device with a pressure source, thereby disengaging the parking lock against the restoring pressure, and in a second extreme position switches the actuator pressureless.

10. The device of claim 1, further comprising a restoring spring for generating or providing the restoring pressure, said restoring spring being assigned to the in actuator.

11. The device of claim 10, wherein the actuator is constructed as hydraulically actuatable actuator.

12. The device of claim 1, wherein the holding device has a locking mechanism for form fitting holding of the actuator or the parking lock in the disengaged state.

13. The device of claim 12, wherein the locking mechanism is constructed as an electromagnetically actuatable locking mechanism.

14. A method for operating a parking lock of a motor vehicle, comprising:
- actuating an actuator device of the parking lock with a transmission control device for disengaging the parking lock against a restoring force; and
- actuating a holding device of the parking lock with a selector-lever control device for holding the parking lock in the disengaged state, wherein the transmission control device and the selector-lever control device are in communication with each other.

* * * * *